Feb. 23, 1971 L. D. DRAKE 3,565,722
DEVICE AND PROCESS FOR PRODUCING SILK SCREEN MEMBERS MOUNTED
ON CARRIER SHEETS IN PREDETERMINED RELATIONSHIP
Filed May 24, 1967 2 Sheets-Sheet 1

INVENTOR
LOREN DWAYNE DRAKE

BY Irwin C. Alter
ATTORNEY

Feb. 23, 1971 L. D. DRAKE 3,565,722

DEVICE AND PROCESS FOR PRODUCING SILK SCREEN MEMBERS MOUNTED ON CARRIER SHEETS IN PREDETERMINED RELATIONSHIP

Filed May 24, 1967 2 Sheets-Sheet 2

INVENTOR
LOREN DWAYNE DRAKE

BY Irwin C. Alter
ATTORNEY

United States Patent Office 3,565,722

Patented Feb. 23, 1971

3,565,722

DEVICE AND PROCESS FOR PRODUCING SILK SCREEN MEMBERS MOUNTED ON CARRIER SHEETS IN PREDETERMINED RELATIONSHIP

Loren D. Drake, Chicago, Ill., assignor to Northwest Screen Print Co., Chicago, Ill., a corporation of Illinois

Filed May 24, 1967, Ser. No. 641,012
Int. Cl. B32b *31/18*
U.S. Cl. 156—265 9 Claims

ABSTRACT OF THE DISCLOSURE

The process includes die cutting a plurality of silk screen members which could be of different shapes and thereinafter superimposing said silk screen members so that like silk screen members are each stacked together to form a plurality of vertical stacks selectively spaced from one another. Then causing one of said silk screen members on the outside of each of said stacks to be mounted on a carrier sheet in a predetermined relationship. The device includes a fount having a plurality of vertical chambers that are shaped to receive said stacks of silk screen members in addition to being disposed in a predetermined relationship with each other. Plungers are slidably mounted therein at one end and the plungers are associated with means for slidably actuating them simultaneously in said chambers to force said silk screen members out of the fount and into engagement with said carrier sheet at the other end of the chambers. A stop member is disposed proximate to the other end of the chambers and carrier paper is interposed between the stop member and said other end of the chambers in order that silk screen members that are stacked vertically in the chambers can be forced thereagainst to be attached to the carrier sheet in a predetermined relationship when the plungers are slidably actuated.

This invention relates to a method and device to accomplish the mounting of silk screen members on carrier sheets in predetermined relationship.

The pre-spacing of silk screen members on carrier sheets is of particular importance when it is desired to mount the silk screen members (whether they be emblems, letters, designs, etc.) on a surface in a predetermined relationship. For purposes of this application the term "silk screen members" shall be defined as any material or indicia of a non-fibrous nature which at some time during the course of manufacture and/or application is conveyed on a carrier paper and ultimately transferred to another surface. Where the silk screen members have a pressure sensitive adhesive backing they can be applied merely by applying pressure to the carrier paper and after the silk screen members are adhered to the surface the carrier paper can be peeled off the silk screen members thereby accomplishing the mounting of the silk screen members in a predetermined fashion. While mounting a silk screen member in this fashion is more desirable in view of the amount of silk screen material that can be saved as will be more fully explained hereinafter, existing methods generally do not include the use of a carrier paper because of the fact that heretofore the cost of mounting the members in a predetermined fashion on a carrier paper made this method prohibitive. Existing methods of mounting the silk screen members on carrier paper include the utilization of a blueprint and individually placing each silk screen member in alignment with an outline on the blueprint and thereafter attaching the carrier paper thereto while the silk screen members lay in alignment in a prespaced fashion on a blueprint. In addition to the fact that such a method is costly from a standpoint of using manual labor, the end product from a quality standpoint leaves much to be desired because of the human error involved. Because of these factors in most instances, a die is used to form the silk screen members from a sheet of material in the exact form or relationship that the silk screen members are intended for final mounting. With this method the spaces between the used material resulting in waste because the material was never utilized.

With my new and improved method and device I have obviated the drawbacks involved with using a carrier sheet by initially dye cutting the pluraliy of silk screen members and vertically superimposing the silk screen members in stacks in a fount which has chambers that are selectively spaced from one another and thereafter simultaneously causing the outer silk screen member of each stack to be mounted on a carrier sheet by means of plungers which are shaped and adapted to be reciprocatingly driven in the chambers.

It is therefore a prime object of this invention to provide a new and improved method and device for mounting silk screen members in a predetermined relationship with respect to each other on a carrier sheet.

It is further an object of this invention to provide a new and improved method and device for producing silk screen members which are mounted on a carrier sheet in a predetermined fashion where waste of material can be kept to a minimum.

It is further an object to provide a new and improved method and device which accomplishes the mounting of silk screen members on a carrier sheet in a predetermined relationship faster and more efficiently than prior methods and devices.

Other and further objects of this invention will become more apparent from reading the specification along with the accompanying drawings wherein.

Figure 1:
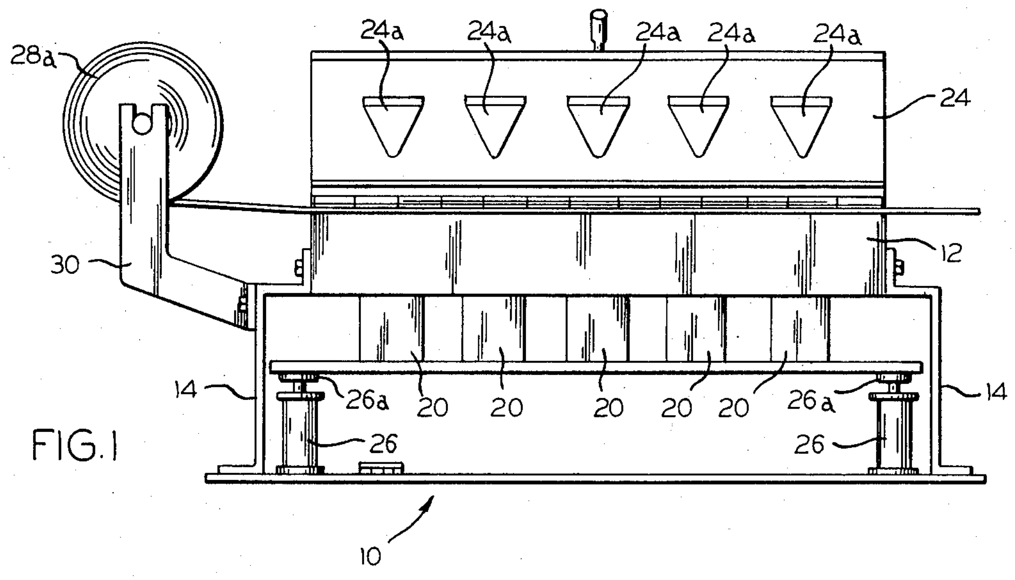
FIG. 1 is a side elevational view illustrating a preferred embodiment of a device which is constructed and works according to my invention.
Figure 6:
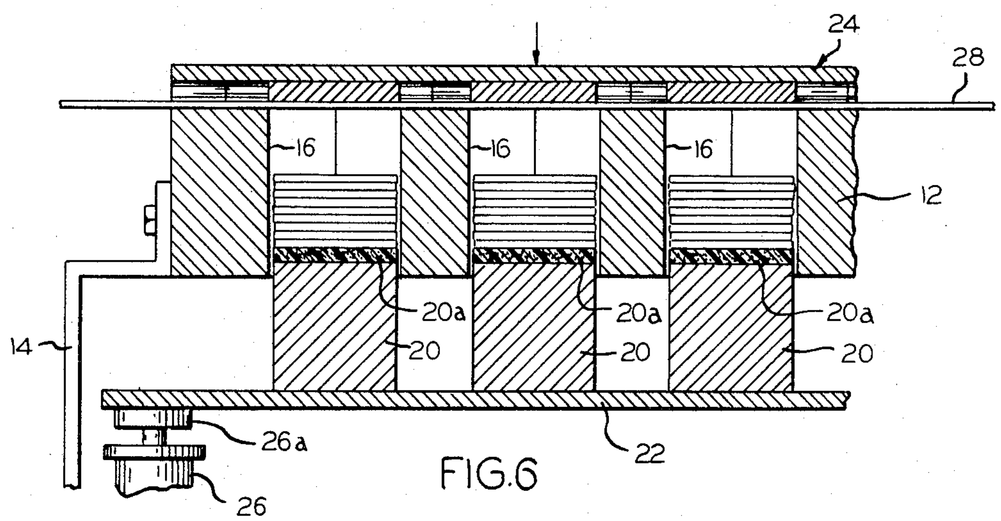
FIG. 6 is a partial sectional view of FIG. 2 illustrating my device with the stop member thereof in its closed position.

Referring to the drawings wherein like characters of reference indicate corresponding parts throughout the preferred embodiment of my device 10 includes a fount 12 which is shown supported by a plurality of legs 14 as illustrated in FIG. 1. The fount 12, as illustrated in FIG. 6, has a plurality of vertical chambers 16 which for purposes of illustration are triangular in cross-section in order that the cross-section thereof conforms with the examples of silk screen members 18 illustrated therein. It should be realized, however, that the chambers 16 on the fount can be shaped and spaced apart differently in accordance with the shape of the silk screen members to be mounted on the carrier sheet and the interrelationship of the desired design between the silk screen members.

A plurality of plunger members 20 each having a triangular cross-section which is shaped in conformity with one of said chambers are mounted in respectively shaped chambers for slidable association therewith, as illustrated in FIG. 6. Also, for purposes of avoiding breakage and ease of mounting the silk screen members, resilient means such as the sponges 20*a* are disposed in the chambers interposed between the plungers and silk screen members. In order to simultaneously actuate the plunger members upward in the chambers when this is desired, a riser plate 22 is associated with said plunger members 20.

Figure 2:
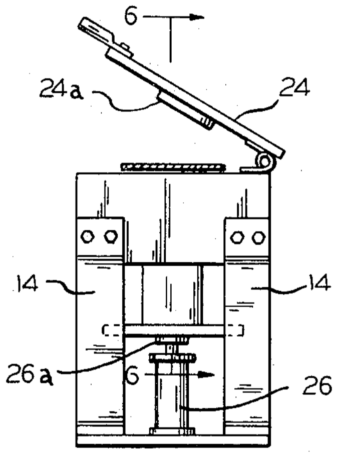
FIG. 2 is a front elevational view of FIG. 1.
Figure 7:
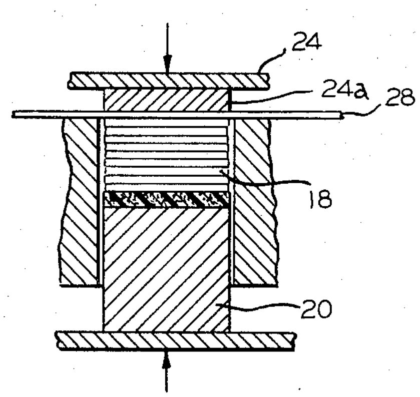
FIG. 7 is an enlarged sectional view similar to FIG. 6 wherein one of the plungers of my device is illustrated as forcing the upper silk screen member of a stack therein against a carrier paper.
Figure 8:
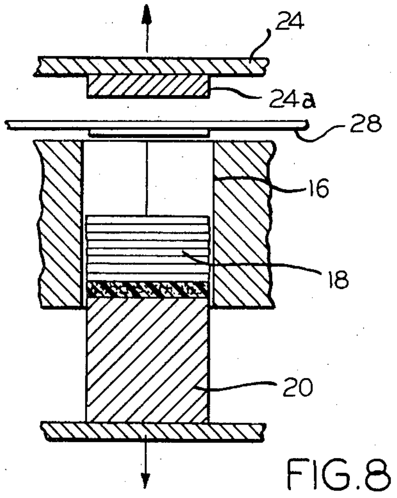
FIG. 8 is a view similar to FIG. 7 with the plungers thereof moving away from their position in FIG. 7 after forcing the silk screen member aginst said carrier sheet.

A stop plate 24 is hingedly associated with the fount 12 as illustrated in FIG. 2 and has stop members 24*a* which are positioned on said stop plate to coincide with the openings of the chambers at the top of the fount 12 when the stop plate is in its closed position as illustrated in FIGS. 6 and 7. The riser plate 22 is preferably illustrated as being associated with an electric solenoid actuating means 26 so that when the solenoids 26 are actuated the pistons 26*a* that are associated therewith move upward to actuate the riser plate 22 and in turn actuate the plungers 20 to the position illustrated in FIG. 7. As can be seen from FIG. 7, when the stop plate and members are in their closed position, they retain the carrier sheet 28 so that the same has a backing for purpose of forcing the silk screen members thereagainst. The solenoid can be actuated by a foot pedal electrically connected thereto. However, since such expedients are well known the same have not been illustrated.

As seen from FIG. 1 the carrier sheet 28 can be associated with my device in the form of a roll 28*a* which is rotatably mounted with respect to my device by means of an arm 30 so that when the roll 28 is unravelled, it is placed across the chambers of the fount. As illustrated in FIGS. 1 and 6 when the silk screen members are mounted to the carrier sheet, the carrier sheet can then be severed and a new piece of material can be unravelled from the roll 28a for positioning on top of the chambers 16.

Figure 9:
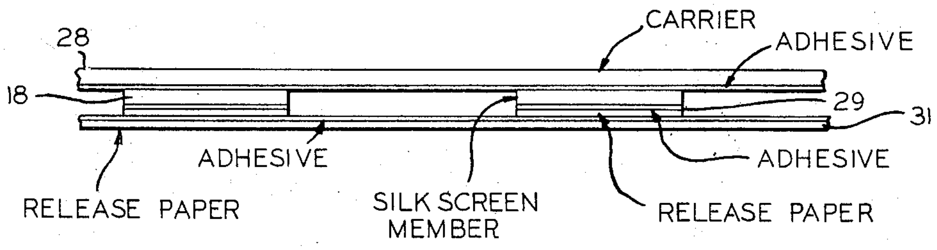
FIG. 9 is a side elevational view illustrating a carrier sheet and release paper which has a silk screen member sandwiched therebetween in order that the same can be shipped.

The carrier sheet 28 is shown as having a pressure sensitive adhesive thereon in order that when the silk screen members are forced thereagainst they are adhered thereto. In FIG. 9 it is seen that the silk screen members have a pressure sensitive adhesive surface which is covered by release paper so that the same can be shipped. When the same is shipped and it is ready for use, the release paper can be removed and the pressure sensitive adhesive of the silk screen members is used to adhere the silk screen members to a surface after the carrier sheet has been pressed thereagainst. The carrier sheet can be chemically treated so that the pressure sensitive adhesive is not as strong as the pressure sensitive adhesive of the silk screen members. Thus, when the silk screen members are pressed against a surface by applying pressure to the carrier sheet, the adhesive thereof is adhered to the surface and the carrier paper 28 need merely be removed. In FIG. 9 individual release paper members 29 are adhered to the silk screen members and there is also a master release paper 31 which is in turn adhered to the release paper members. When the master release paper 31 is removed the individual release paper member 20 so that the silk screen members' adhesive surface is ready for application. Such a structure could, however, be modified so that there need merely be one release paper applied to each of the silk screen members.

Figure 3:
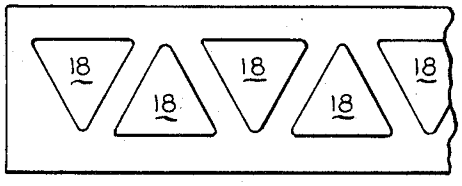
FIG. 3 is a top view illustrating how silk screen members can be die cut with a minimum of waste.
Figure 4:
FIG. 4 illustrates one of the silk screen members of FIG. 3 after it has been cut from its original material.
Figure 5:
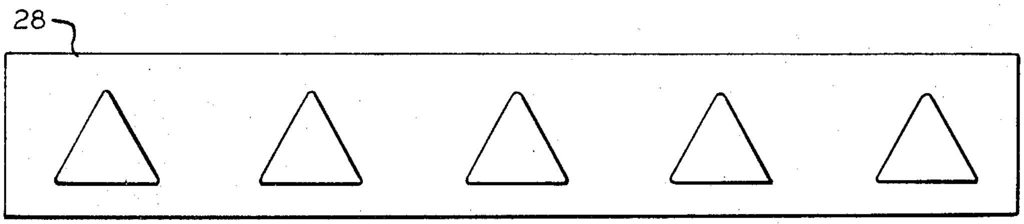
FIG. 5 is a top view illustrating the silk screen members of FIGS. 3 and 4 as they have been finally mounted on a carrier sheet in a prespaced relationship.

From an understanding of my invention, it can be seen that the method employed by my device fulfills the object of this invention in a remarkably unexpected fashion. By initially die cutting silk screen members as illustrated in FIG. 3 the waste resulting from having to die cut the members in a prespaced fashion is avoided. Thereafter, when the silk screen members are superimposed in the vertical chambers of the fount, vertical stacks are formed that are relatively spaced from one another and the plungers cause the silk screen members on the top of each of the stacks to be attached to the carrier sheet as illustrated in FIG. 7. The unsatisfactory method of manually mounting individual silk screen members on blueprints as hereinbefore mentioned is avoided. Thus, while I have illustrated my method in conjunction with a specific device, it should be appreciated that the invention herein should not be limited by the specific shape of the parts of my device.

Having thus described the invention what I claim is:

1. A process of manufacturing a plurality of silk screen members that are disposed in a predetermined relationship with respect to each other on a carrier sheet, comprising the steps of:

die cutting the silk screen members, superimposing said silk screen members into vertical stacks that are selectively spaced from one another, moving said stacks and carrier sheet relative to each other, compensating for difference is in the height of the individual stacks to form a contiguous relationship between said carrier sheet and each of said stacks, increasing the movement of said carrier sheet after the height of said stacks decrease below a predetermined level, and causing one of said silk screen members on the outside of each of said stacks to be mounted on said carrier sheet, whereby said silk screen members are mounted on said carrier sheet in a predetermined relationship with a minimum of waste.

2. In a process, as defined in claim 1, wherein the upper most of said silk screen members on each stack is actuated into contact with said carrier sheet for attachment by simultaneously applying pressure on the lower portion of each stack and pressing said carrier sheet against said uppermost silk screen members in each of said stacks.

3. An improved device for mounting silk screen members that are disposed in a predetermined relationship with respect to each other on a carrier sheet comprising:

a fount having a plurality of vertical chambers with a cross-section formed in conformity with the shape of each one of said silk screen members and being disposed in a predetermined relationship with each other, and a plurality of plunger members each having a cross-section shaped in conformity with said chambers for slidable association with each of said chambers, said plunger members being positionable in a respective one of said chambers and being associated with means for slidably actuating said plungers simultaneously in said chambers on one end of said chamber, a stop member disposed proximate to the other end of said chambers, said stop member including characterized means amenable to fitting into said chambers, and carrier paper means for interposing a preselected amount of said carrier paper between said stop member and said other end of said chambers, whereby silk screen members can be stacked vertically in said chambers and the outer members closest to said stop member can be forced against and attached to said carrier sheet in a predetermined relationship when said plungers are slidably actuated to force said outer silk screen members against said carrier paper and said stop member and whereby said characterized means compensates for differences in the heights of the stacked silk screen members.

4. An improved device, as defined in claim 3, wherein resilient members are interposed between said plungers and said silk screen members.

5. An improved device, as defined in claim 3, wherein said stop member is hingedly associated with said device and has an open and a closed position, said stop member contacting the upper end of said chambers in its closed position, said characterized means comprising blocks conforming to the shape of said chambers, and said plungers being disposed underneath and contacting the lowest silk screen members of said stacks.

6. An improved device, as defined in claim 3, wherein said plungers are reciprocatingly actuated in said chambers and each has a stroke that enables it to force said uppermost of said silk screen members against said carrier sheet.

7. An improved device, as defined in claim 6, wherein said plungers are mounted on a riser plate and said plate is associated with an electrical solenoid to reciprocatingly actuate said plungers.

8. An improved device for mounting silk screen members that are disposed in a predetermined relationship with respect to each other on a carrier sheet comprising:

a fount having a plurality of vertical chambers with a cross section formed in conformity with the shape of each one of said silk screen members and being disposed in a predetermined relationship with each other, a plurality of plunger members each having a cross section shaped in conformity with said chambers for slidable association with each of said chambers, each of said plunger members being positionable in a respective one of said chambers and being associated with means for slidably actuating said plunger simultaneously in said chambers on one end of said chamber, a stop member disposed proximate to the other end of said chamber, carrier paper means for interposing a pre-selected amount of said carrier paper between said stop member and said other end of said chamber, said silk screen members being stacked vertically in said chambers with the outer silk screen member being closest to the stop member for being forced against and attached to said carrier sheet in a predetermined relationship when said plunger is slidably actuated to force its outer silk screen members against said carrier paper and said stop member, said plungers being mounted on a riser plate, said plate being associated with an electrical solenoid to reciprocally actuate said plunger, said plungers being reciprocally actuated in said chambers and each having a stroke enabling said individual plungers to force said uppermost of said silk screen members against said carrier sheet, and said stop members having blocks attached thereto that are shaped to conform to the cross section of each of said chambers and disposed to be forced against the top of said chamber upon moving the stop member to said closed position.

9. An improved device, as defined in claim 8, wherein said carrier paper means is in the form of a roll and it is rotatably mounted on said device, said release paper being positionable over the top of said fount after being unravelled whereby said silk screen members are forced against and attached to said unravelled release paper.

References Cited

UNITED STATES PATENTS

| | | | |
|---|---|---|---|
| 2,467,565 | 4/1949 | Owens et al. | 156—519X |
| 2,760,547 | 8/1956 | Dempnock, Jr. | 156—564 |
| 3,389,038 | 6/1958 | Robison, Jr. | 156—552X |

VERLIN R. PENDEGRASS, Primary Examiner

U.S. Cl. X.R.

156—303, 519, 564